Nov. 15, 1955 R. C. FERGASON 2,723,519
COTTON PICKING UNIT WITH SPECIFIC
SLAT HINGE MEANS
Filed June 24, 1954 3 Sheets-Sheet 1

Inventor
Rector C. Fergason
by
Attorney

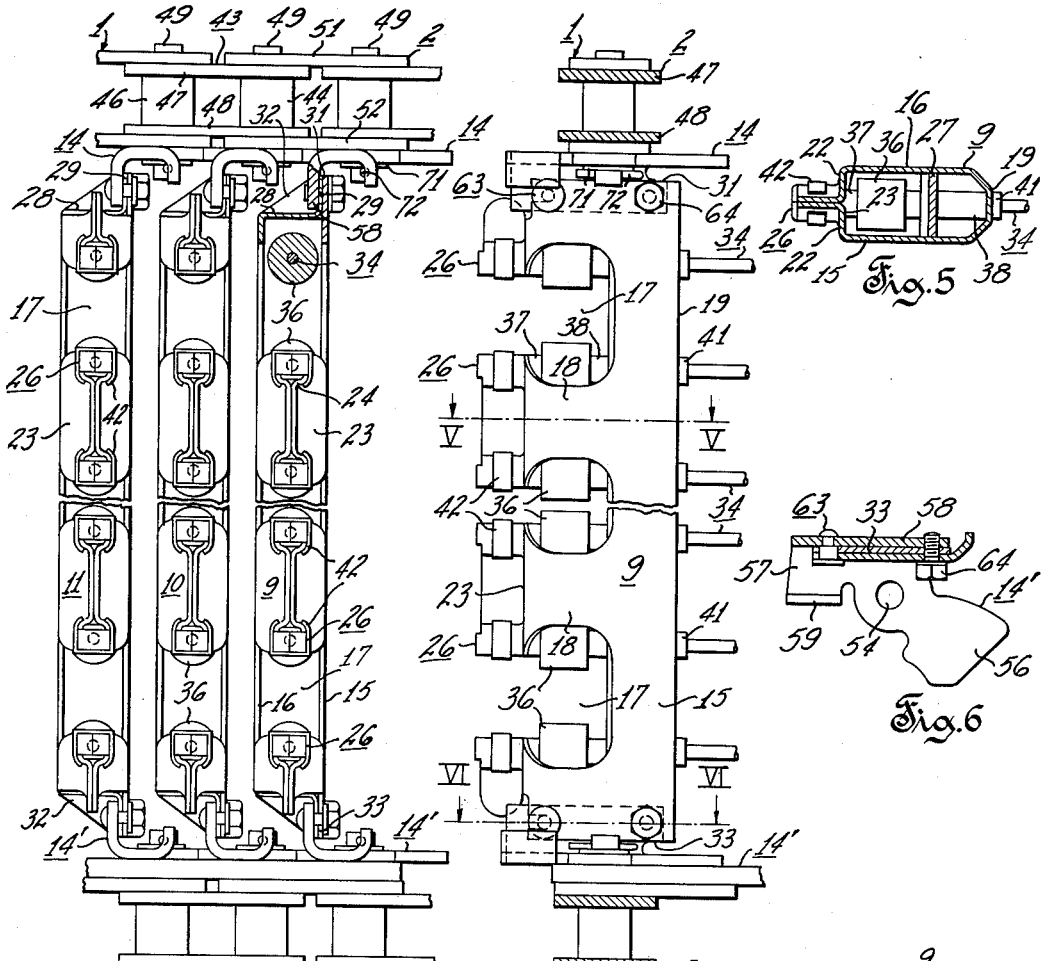
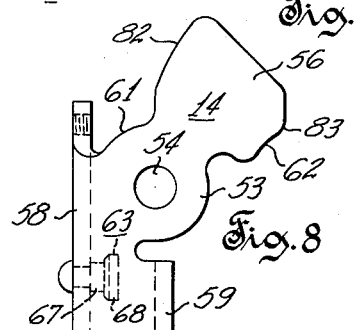
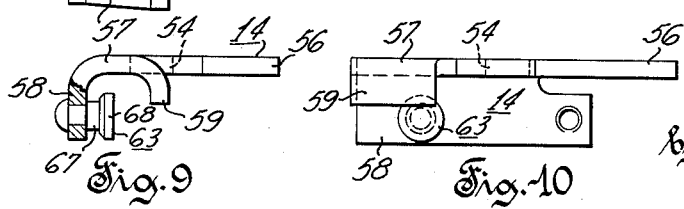

United States Patent Office 2,723,519
Patented Nov. 15, 1955

2,723,519

COTTON PICKING UNIT WITH SPECIFIC SLAT HINGE MEANS

Rector C. Fergason, Gadsden, Ala., assignor to Allis-Chalmers Manufacturing Company, Milwaukee, Wis.

Application June 24, 1954, Serial No. 439,058

11 Claims. (Cl. 56—42)

This invention relates to cotton harvesters, and it is concerned more particularly with an improved picking mechanism of the rotary spindle type.

Cotton harvesters of the rotary spindle type have heretofore been suggested wherein the spindles are mounted on vertical slats so as to extend horizontally therefrom, and wherein a series of such slats are moved in an oblong path to present the spindles in picking condition while they move along one side of the path, and to present the spindles in stripping condition while they move along the other side of the oblong path. Details of such a machine, and particularly of the slats and spindle mountings as heretofore used, are disclosed, for instance, in U. S. 2,671,298, issued March 9, 1954, to R. C. Fergason for Cotton Picker.

In cotton harvesters of the hereinabove outlined character the spindle slats become subject to centrifugal force when they pass from the picking side to the stripping side of the oblong path around one end, usually the rear end of the latter and, as a result, the slats tend to whip at that end of the oblong path about their pivotal mountings on the carrier chains. Such whipping of the slats is apt to bring the picking ends of the spindles of adjacent slats into contact with each other when the slats pass the point on the oblong path where they are forced into a reclined stripping position. Such contact of the spindles has been found very objectionable because of the resulting damage to spindles, known as "ringing."

On the other hand, when the slats pass from the stripping side of the oblong path to the picking side, at the other end, usually the forward end, of the oblong path, they become again subject to centrifugal force, and in that case portions of adjacent slats on which the bearings for the inner ends of the picking spindles are mounted are apt to bump into each other with consequent damaging results.

Generally, it is an object of the present invention to provide an improved picking mechanism for cotton harvesters which will take care of the hereinabove outlined difficulties presented by the ringing of the spindles and by the bumping of adjacent slats against each other.

More specifically, it is an object of the invention, to provide an improved picking unit for cotton harvesters wherein the pivotally adjusted positions of the slats about their respective pivot axes are controlled by means of stops on the slat hinges.

A further object of the invention is to provide an improved picking mechanism of the hereinabove outlined character wherein the slat hinges are provided with control wings for preventing ringing of the spindles and for determining the picking positions of the spindles as the slats move along the picking side of the oblong path of slat travel.

A further object of the invention is to provide an improved picking mechanism of the hereinabove outlined character wherein hinge brackets for the spindle slats are each provided with a mounting flange and with a stop flange in such relation to each other that relative engagement of the stop flange of one hinge bracket with the mounting flange of an adjacent hinge bracket will be effective to prevent the slats from bumping into each other as they pass from the stripping side toward the picking side of the oblong path.

A still further object of the invention is to provide an improved slat hinge or hinge bracket incorporating a control wing, a mounting flange, and a stop flange for determining pivotally adjusted slat positions in the assembled picking unit.

A still further object of the invention is to provide an improved hinge bracket of the hereinabove outlined character which is of utmost simplicity, which may readily be installed and removed, and which lends itself to mass production at a minimum of costs.

The foregoing and other objects and advantages are attained by the present invention various novel features of which will become apparent from the description herein of a preferred embodiment of the invention, and will be set forth in the appended claims.

Referring to the drawings:

Fig. 3 is an elevational view of part of the picking unit shown in Fig. 1, the view of Fig. 3 being taken from the outside of the unit and looking toward the picking side thereof;

Fig. 4 is a side elevation of one of the spindle slats and associated parts shown in Fig. 3;

Fig. 5 is a sectional view taken on line V—V of Fig. 4;

Fig. 6 is a sectional view taken on line VI—VI of Fig. 4 showing a detail of the mounting of the spindle slats;

Fig. 7 is a fragmentary view of the lower end of the spindle slat shown in Fig. 4;

Fig. 8 is an enlarged plan view of one of the upper hinge brackets shown in Fig. 3;

Fig. 9 is a rear elevational view with parts broken away and shown in section of the hinge bracket shown in Fig. 8; and Fig. 10 is a side view of the hinge bracket shown in Fig. 9.

Figure 1:
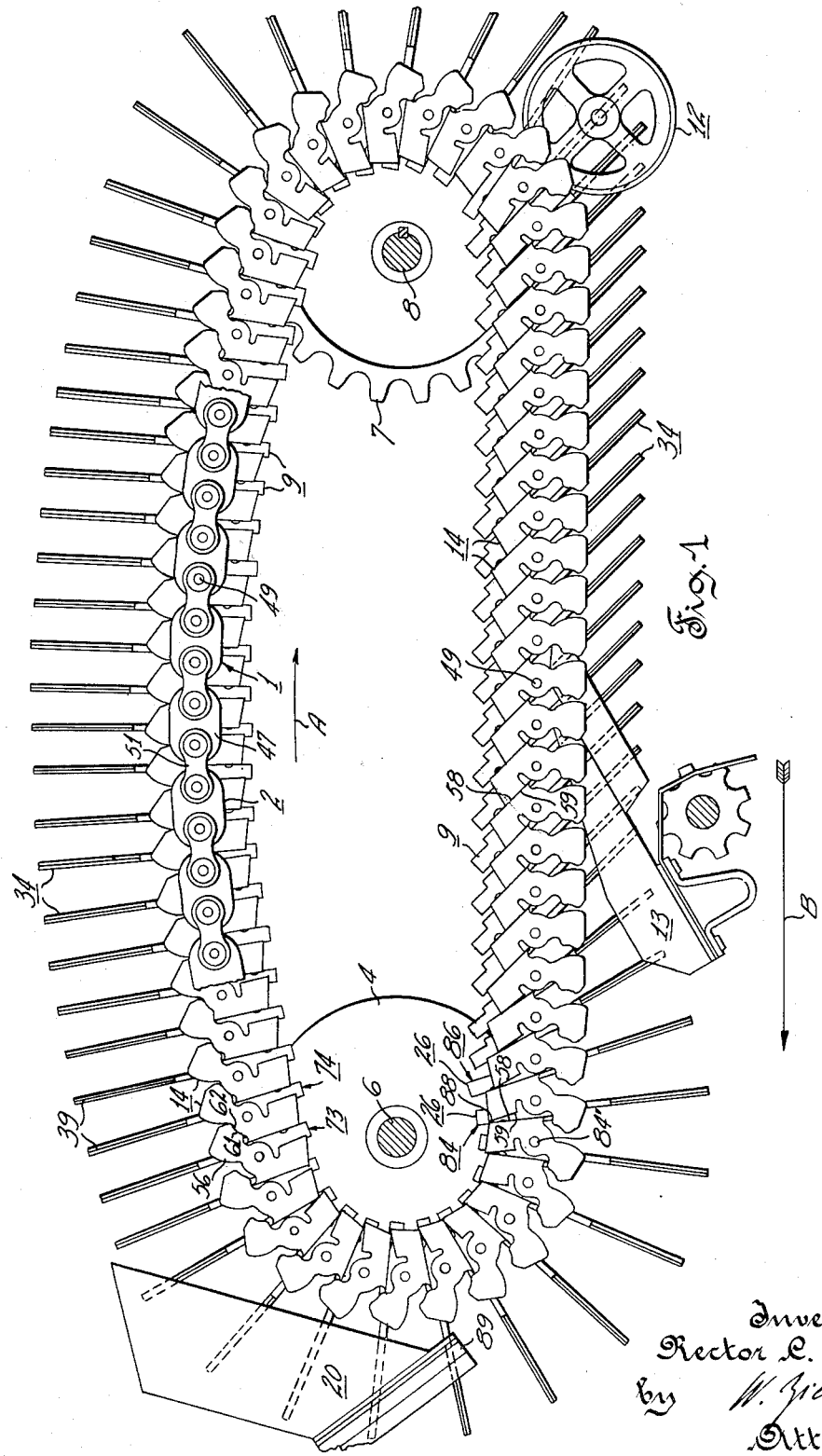
Fig. 1 is a plan view of a cotton picking unit with parts removed and other parts broken away and shown in section for purposes of disclosure.

Referring to Figs. 1, 3 and 4, a conveying mechanism designated generally by the reference character 1, comprises a pair of upper and lower endless conveying elements in the form of chains 2 and 3 which are trained about a vertically spaced pair of idler wheels 4 (only lower shown) carried by shaft 6 located at the front end of the picking unit, and about a pair of vertically spaced drive sprockets 7 (only lower shown) carried by drive shaft 8 positioned at the rear end of the unit. The shafts 6 and 8 are carried by a suitable frame structure (not shown) of the picking unit which is of generally conventional construction, such as shown in the above mentioned U. S. Patent 2,671,298.

The endless chains 2 and 3 are mounted for travel about the oblong path which is outlined in its entirety in Fig. 1. The arrow A in Fig. 1 indicates the direction in which the chains move in operation of the unit, and the arrow B indicates the direction in which the harvester is propelled during the picking operation. The pivotally mounted slats 9 and associated spindles assume a right angled position relative to the carrying chains 2 and 3 during passage along the picking side of the oblong path, that is, the curved side appearing in Fig. 1. A slat retarding device 12 of conventional type in proximity to the drive sprocket 7 serves to pivot each passing slat to reclined stripping position in preparation for its passage through a suitable stripping device 13 located on the stripping side of the oblong path. From the stripping side of the oblong path the slats 9 move to the picking side about front idler wheels 4 and are carried through a suitable moistening device 20 which is positioned adjacent the front idler wheels. After the spindles are moistened they are again presented at a right angled position preparatory to passing along the picking side of the oblong path.

Referring to Figs. 3 and 4, hinge brackets 14 and 14' are shown connecting the upper and lower ends of spindle slats 9, 10 and 11 to the upper and lower carrying chains 2 and 3. As shown in Figs. 3 and 5, the slat 9 is stamped from relatively heavy sheet metal and formed to the desired shape. The body of the slat 9 comprises vertically extending, horizontally opposite relatively wide side walls 15 and 16. As best shown in Fig. 4 the side wall 15 is irregularly shaped along one edge to provide a vertical series of deep recesses 17 which are separated by peninsular portions 18 and the side wall 16 is of identical configuration with the recesses 17 of each side wall being in horizontal alignment with each other. The side walls 15 and 16 are formed integral with a convex outer cross wall 19 which is relatively narrow and which extends longitudinally of the slat body 9 along the edges of the walls 15 and 16 which do not contain recesses 17. The edges of walls 15 and 16 between recesses 17 present flange portions 22 which are rigidly secured together as by spot welding to form the cross wall 23 (Fig. 5). The flange portions 22 of walls 15 and 16 which lie between the recesses 17 in the slat 9 (Fig. 4) are double bent at 24 (Figs. 3 and 4) so as to provide bearing pockets 26. A spacing and bearing mounting strip 27 (Fig. 5) is placed edgewise between side wall 15 and side wall 16 and is rigidly secured therein by suitable means not shown.

As shown in Fig. 3, the upper portion of side wall 16 is bent inward at right angles toward side wall 15 and thereby forms a top wall 28. Side wall 15 extends straight up past top wall 28 and is rigidly connected with a vertical extension 29 of top wall 28 which is in face to face engagement with side wall 15, thus forming an upper mounting flange 31 of double thickness. A triangular brace 32 formed integral with convex cross wall 19 connects side wall 16 with the top edge of mounting flange 31. The vertical mounting flange at the top of slat 9 serves to secure the slat to the associated hinge bracket 14 as will be more fully explained below.

The construction of the upper end of the slat 9 is duplicated at the lower end of the slat 9 which thus provides a lower mounting flange 33 identical to the upper flange 31.

The mounting of the picking spindles 34 is best shown in Figs. 4 and 5 and it will be noted that each spindle has a cylindrical drive roller 36 fixedly attached adjacent its inner end for cooperation with a suitable spindle drive track assembly (not shown). Each spindle 34 is rotatably supported by inner and outer bearing bushings 37 and 38, respectively, the inner bushings 37 being placed over the short innermost end of the spindle 34, and the outer bushing being placed on the other side of the drive roller, that is on the right side as viewed in Fig. 4. Referring to Fig. 4, the spindles 34 are inserted in the slat with a picking portion 39 of each spindle projected through suitable apertures provided in the convex cross wall 19 of the slat. The outer bushing 38 has a circular end collar 41 projected through the aperture in the cross wall 19. As best shown in Fig. 5, the rear or inner bearing 37 is seated in the end pocket 26 and retained therein by a suitable clip 42.

The above explanation of the spindle mounting applies to each spindle of the row of spindles 34 on each slat of the picking unit.

As mentioned above, the slats 9, 10 and 11 shown in Fig. 3 are part of an endless series of slats which are mounted on endless carrying chains 2 and 3 as shown in Fig. 3. Referring to the upper chain 2 which comprises a series of links 43, each link 43 has a pair of bushings 44 and 46 which are rigidly connected in spaced parallel relation to each other by a pair of side plates 47 and 48. A hinge pin 49 is rotatably mounted in each bushing, and each link 43 is pivotally connected to an adjacent link by means of upper and lower connecting plates 51 and 52. The pivot pins 49 are rigidly secured to the upper connecting plates as by riveting, each pivot pin 49 being longer than the vertical distance between the outermost sides of the connecting plates 51 and 52 so that a substantial portion of each pivot pin 49 projects downward from the lower connecting link 52 as shown in Fig. 3. The downwardly projecting portions of the pins 49 present vertical pivot elements connected with the conveying element 2 in spaced relation to each other lengthwise of the latter and, as will be explained more fully hereinbelow, the spindle slats 9 are mounted for pivotal movement on the axes of these pivot elements and for advance movement transversely to said axes along the oblong path of movement of the chains 2 and 3.

The lower carrying chain is similarly constructed but differs slightly in that the lower pivot elements, as shown in Fig. 3 project upward toward the upper chain 2.

Referring to Figs. 3 and 8, an upper hinge bracket generally designated by the reference character 14, serves to pivotally mount the slat 9 on the pivot pins 49 of the upper chain 2, and a lower hinge bracket 14' which is an opposite hand duplicate of the upper hinge bracket 14 pivotally mounts the slat 9 on the lower chain 3. The upper hinge bracket 14, as best shown in Figs. 8, 9 and 10, is made of a single piece of relatively heavy plate metal and comprises a hub portion 53 having a hinge pin receiving aperture 54 therethrough, a control wing 56 extending radially outward from hub portion 53 at one side of and in a plane at right angles to the axis of the hinge pin receiving aperture 54, and a mounting wing 57 merging with hub portion 53 and offset, circumferentially of the latter, from control wing 56. The control wing 56 presents a first stop portion 82 and a second stop portion 83, these stop portions being spaced radially from the pivot axis of the hinge bracket and offset circumferentially thereof from each other. Specifically, the stop portions 82 and 83 are formed on the control wing 56 at outwardly extending relatively opposed side edges of the latter.

The mounting wing 57 presents an attaching flange or side member 58 in a plane extending parallel to and spaced radially from the axis of the hinge pin receiving aperture 54, and a stop flange 59 merges with the mounting wing 57 at a radially outer portion of the latter and extends parallel and in transversely spaced relation to the attaching flange 58. It will be noted by reference to Fig. 8 that the hub portion 53 has an arcuate stop edge 61 intermediate the control and mounting wings at one side of bracket 14, and control wing 56 has an arcuate recess or stop margin 62 in an edge portion thereof at the other side of bracket 14. It will be further noted that the curvature of arcuate recess 62 approximately conforms with the curvature of the arcuate stop edge 61 of hub portion 53.

The relation between stop flange 59 and side member or mounting flange 58 is best shown in Figs. 8 and 9. Stop flange 59 extends parallel to mounting flange 58 in the direction of a radial line drawn through the axis of hinge pin receiving aperture 54. As above described the hinge bracket is formed out of a single piece of plate metal which has a flat part forming the hub portion 53 and control wing 56, an upstanding part forming attaching flange 58, and another upstanding part forming stop flange 59.

The hereinbefore explained features of the upper hinge bracket 14 are similarly incorporated in the lower hinge bracket 14'. Comparing the upper and lower hinge brackets with each other, it will be noted that the attaching flange 58 of upper hinge bracket 14 is bent downward whereas the attaching flange 58 of lower hinge bracket 14' is bent upward. Due to this construction the control wings of the upper and lower ends of the slat 9 will extend outward relative to the oblong path of slat travel.

The hinge brackets 14 are pivotally connected to the upper carrying chain 2, and in that connection, it will be noted that the lower end of hinge pin 49 which is located between the upper ends of slats 9 and 10 extends downwardly through the circular hinge pin receiving aperture 54 of the hub 53. The aperture is accurately finished, as by reaming for a close running fit on hinge pin 49, and the hinge bracket 14 is retained on the pin 49 by means of a washer 71 and a cotter pin 72 which is inserted through a hole in the hinge pin 49 below washer 71.

The slats 9 and their associated hinge brackets 14 are detachably fastened together by separable connecting means. These separable connecting means consist of a stud 63 (Fig. 9) which is fixedly secured as by riveting to attaching flange 58, and a cap screw 64 (Fig. 6) which extends through a hole 66 (Fig. 7) in the upwardly extending flange 31 of the slat 9 and is threaded into a tapped hole of the attaching flange 58. The stem 67 of stud 63 is of a reduced diameter thus providing an enlarged head 68, and an open ended slot 69 (Fig. 7) of a width slightly greater than the diameter of stem 67 is provided in the inner edge of slat flange 31. In the connected condition of the slat and hinge bracket the slot 69 straddles the reduced stem 67 of stud 63, and cap screw 64 is tightened in the threaded hole of flange 58.

From the foregoing explanations it will be apparent that the picking mechanism shown in Fig. 1 comprises a series of spindle slats 9 each mounting a row of rotary picking spindles 34, a series of hinge brackets 14 secured, respectively, to the spindle slats 9, and a series of pivot elements or pins 49 in cooperative engagement, respectively, with said hinge brackets for pivotally mounting said spindle slats.

In operation, the slats 9 move transversely of their pivot axes in endless succession along the curved picking side and the straight stripping side of the oblong path of slat travel. While the slats pass along the picking side of the oblong path the picking spindles 34 are positioned at right angles to the direction of movement of the carrying chains 2 and 3. In conformity with established practice, the rate of rearward travel of the spindles 34 in the direction of arrow A, is substantially the same as the rate of forward travel of the harvester in the direction of arrow B. This synchronization is necessary in order that the spindles remain in a fixed picking contact with the bolls of cotton for a maximum length of time.

For purposes of analysis, a pair of adjacent spindle slat assemblies are designated in Fig. 1 by reference characters 73 and 74. As these slat assemblies enter the picking side of the oblong path after passing about front idler 4 and through the spindle moistening device 20, the drive rollers 36 of their respective spindles encounter stationary drive tracks (not shown) which extend substantially the entire length of the picking side of the oblong path. It will be noted by reference to Figs. 1 and 4 that the drive rollers of a slat are located to the inside of the upper and lower chains 2 and 3, that is, to the left, as viewed in Fig. 4, of the slat pivot axis determined by aligned hinge pins 49. The mentioned contact of the drive rollers 36 with the spindle drive tracks results in a tendency of the slat to pivot rearward about its pivot axis, that is, the picking ends of the spindles tend to swing beyond their right angle positions toward the drive sprocket 7. In the mechanism as shown in Fig. 1, such swinging of the spindles beyond the right angle position is prevented, and in that connection the following should be noted.

In order to determine pivotally adjusted positions of slat assemblies 73 and 74 as they move along the oblong path, thrust transmitting means are associated with each hinge bracket 14. Such thrust transmitting means comprise, at each of hinge brackets 14, the hereinbefore mentioned control wing 56, and the hereinbefore mentioned stop edge or arcuate edge portion 61. Upon rearward movement of the successive slat assemblies 73 and 74 along the picking side of the oblong path rearward pivotal movement, that is, movement of the picking portion 39 of the spindle toward the rear drive sprocket 7, will be limited by cooperative engagement of control wing 56 of the trailing slat assembly 73 with the stop edge 61 of the leading slat assembly 74, as shown in the upper part of Fig. 1, and at an enlarged scale at the upper part of Fig. 2.

Figure 2:
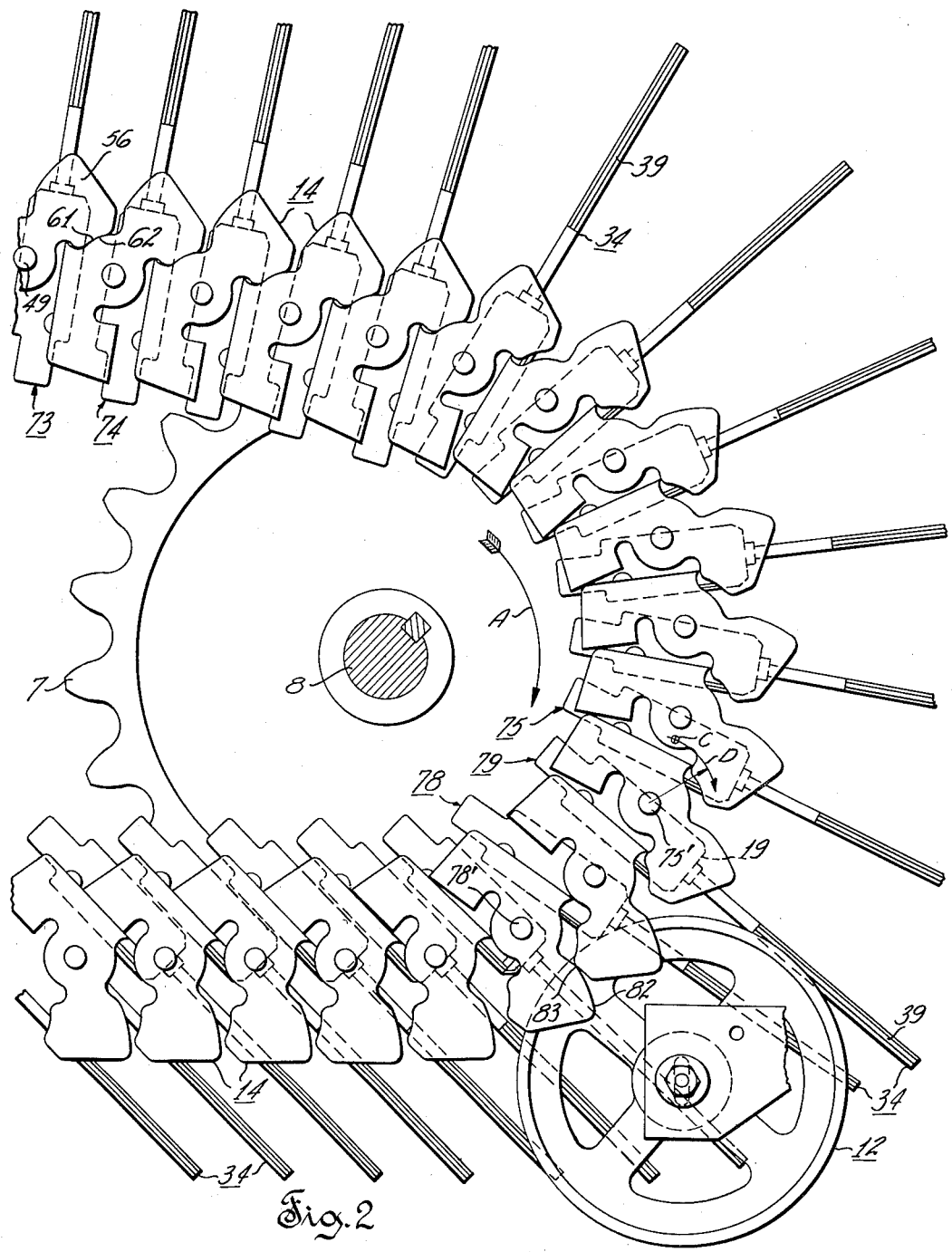
Fig. 2 is an enlarged plan view of one end of the picking unit shown in Fig. 1 with parts removed and other parts broken away and shown in section for purposes of disclosure.

Referring to Figs. 2 and 8, it will be noted that stop edge 61 is of arcuate configuration and that the curvature of recess or stop margin 62 approximately conforms with the curvature of the arcuate edge or stop edge portion 61. During rearward movement of the pair of relatively adjacent slat assemblies 73 and 74, (Fig. 1), their pivotally adjusted positions will be determined by cooperative engagement of the arcuate recess 62 presented by the control wing 56 of the trailing slat assembly 73 with the stop edge 61 of the leading slat assembly 74.

Upon completion of their passage along the picking side of the oblong path the slat assemblies 73 and 74 travel about the rear drive sprocket 7. The slat retarding device 12 is located, as shown in Fig. 2, adjacent the end of the arcuate path of slat travel about drive sprocket 7 so as to contact the outer convex cross wall 19 of each slat as it passes. As a result, successive slats are forced from a position of centrifugal adjustment assumed in passing about the sprocket 7 to a reclined stripping position as shown in the lower portion of Fig. 2 and at the right of Fig. 1. In operation, the slat carrying chains travel at a substantially uniform rate of speed and the retarding device 12 serves to temporarily retard one portion of the slat, the result of this action being the reclined position of the picking end of each spindle 34 relative to its point of pivotal connection to chains 2 and 3 through its associated slat structure. In this connection it will further be noted that the center of the pivot connection 49 (Fig. 2) of each hinge bracket 14 is offset forwardly from the associated vertical row of picking spindles. As indicated in Fig. 2, the center of gravity of the slat assembly 75 is located approximately at point C, and it is readily apparent that the point C is in trailing relation to the pivot axis 75' of the slat assembly 75. When the slat assembly 75 becomes subject to centrifugal force it will tend to pivot or whip about its pivot axis 75' or (Fig. 2) in the direction of arcuate arrow D, the center of gravity C tending to align itself with a radial line from shaft 8 through pivot axis 75'.

In operation, a critical condition occurs as slat assembly 74 of Fig. 1, in traveling about the oblong path, reaches the position of slat assembly 78 in Fig. 2, and trailing slat assembly 73 of Fig. 1 reaches the position of slat assembly 79 in Fig. 2. It will be noted that slat assembly 78 has contacted the retarding device 12 and has been tilted back about its pivot axis 78', thus reclining the associated spindles 34 toward the spindles of the trailing slat assembly 79. Slat assembly 79, still in a centrifugally adjusted position, continues to travel forward about sprocket 7. In the absence of suitable control means the tips of the spindles 34 associated with slat assembly 78 would contact the picking portion 39 of the spindles of the trailing slat assembly 79. Such contact would result in damage to both sets of spindles and would be very objectionable because it reduces the aggressiveness of the picking spindles of one set by wearing the spindle tips into a bullet like shape, and because it forms grooves or rings in the other set, entailing stripping difficulties.

To prevent ringing contact between the spindles of the leading and trailing slat assemblies the control wing 56 of each hinge bracket is provided with the mentioned first and second stop portions 82 and 83. Cooperative engagement of the first stop portion 82 on the hinge bracket 14 of leading slat assembly 78 with the second stop portion 83 of the hinge bracket 14 of the trailing slat assembly 79 is shown at the right hand lower corner of Fig. 2. It will be noted that the second stop portion 83 contacts the first stop portion 82 before the spindles of slat assembly 78 are able to contact the spindles of the trailing slat assembly 79. The first stop portion 82 is of arcuate configuration and is located on the trailing edge of the control wing and should not be confused with the arcuate stop edge 61 which is part of the edge of hub 53 and which serves to control the picking positions of the slats. It will also be noted that contact between the first and second stop portions 82, 83 initiates the reclining of slat 79 and thus absorbs some of the whipping force and reduces the impact load on the retarding device 12.

Upon leaving retarding device 12, the slat assemblies 78 and 79 maintain the reclined stripping positions which are indicated in the lower part of Fig. 1, and in which positions the picking spindles pass through the stationary cotton stripping device 13. From Fig. 1 it will be seen that the slats and associated spindles upon forward movement from the stripping device 13 gradually pivot forward relative to the slat chain 2 until at the beginning of the arcuate path about idler wheel 4 they are at right angles to the chain 2. This forward pivoting of the slat assemblies is the result of cooperative engagement of the hereinbefore mentioned attaching flange or side member 58 and of the hereinbefore mentioned stop flange 59 of successive slat assemblies. As will be noted by reference to Fig. 1, in the reclined stripping position the stop flange 59 of any selected slat assembly is in face to face engagement with the side member or attaching flange 58 immediately leading it. This engagement serves to maintain the slats in the desired stripping position shown at the lower side of the oblong path in Fig. 1.

The forward pivoting of the slat assemblies is important because it prepares the slats for passage about the front idlers 4, with resulting reduction of whip and impact loading on the hinge brackets 14 as the slat assemblies assume centrifugally adjusted positions about the front idlers 4. Without provision of stop flange 59 the slats would tend to remain in their reclined stripping positions until they reach the periphery of front idler 4 where they would become subject to centrifugal force and would tend to whip about their pivot axes. Such whipping would cause forward swinging of the picking ends of the spindles and, as a result, the inner radial end or inner bearing housing 26 of the leading slat assembly 84 at the left end of Fig. 1, would swing about its pivot axis 84' and contact or bump against the inner bearing 26 of the trailing slat assembly 86 which still is in its reclined stripping position. Damage of the radially inner end or inner bearing housings 26 due to the described causes may be severe enough to necessitate replacement of the slats.

By constructing the hinge brackets as herein disclosed the mentioned damage to the slats will be avoided. As the leading slat assembly 84 swings out to assume a centrifugally adjusted position a portion of its attaching flange 58 (Fig. 8) contacts the inner end portion 88 (Fig. 8) of stop flange 59 of trailing slat assembly 86, thus limiting the converging pivotal movement which would bring the radially inner or bearing end 26 of the leading slat assembly 84 into contact with the radially inner or bearing end 26 of a trailing slat assembly 86. Not only is contact between the radially inner ends of adjacent slats prevented but also some of the whipping effect is dissipated during the pivoting of the slat assemblies to a right angled position relative to the carrying chains 2 and 3. The attaching flange 58 of trailing slat assembly 86 in turn contacts stop flange 59 of the slat assembly which follows it, and a rearward thrust transfer takes place resulting in a gradual increase of the acute angle relationship between the spindles and the carrying chain 2. It is to be understood that a certain amount of running clearance is provided between adjacent hinge brackets to prevent excessive wear and which will permit the gradual positioning of the slats as noted above.

Located adjacent to front idler 4 is the spindle moistening device 20 which serves to moisten each spindle prior to its entrance into the picking side of the oblong path. The moistening device conventionally consists of a vertical series of pairs of wiping elements 89 between which each spindle passes. As any slat passes the moistening device, all of the vertically spaced pairs of wiping elements 89 are simultaneously engaged by the spindles of the passing slat, so that the spindles will be wet when they emerge from the moistening device. As will be noted in Fig. 1, there is no substantial displacement of the slats from their centrifugally adjusted positions in passing through the moistening device 20 even though there is a considerable retarding force placed on the picking portions of the spindles, which would normally result in a pivotal movement of the slat assemblies about their pivot axes. During passage about the front idlers the slat assemblies remain in the pivotally adjusted positions in which they are shown at the left end of Fig. 1, because of the cooperative engagement between the attaching flange 58 of a leading slat assembly with the stop flange 59 of the adjacent trailing slat assembly. Likewise, upon arcuate movement of any pair of adjacent slats about the rear end of the oblong path the radially inner or bearing end 26 of the leading slat will be prevented from contacting the radially inner or bearing end of the trailing slat assembly by cooperative engagement of side member or attaching flange 58 of the hinge bracket 14 of the leading slat assembly with the stop flange 59 of the hinge bracket of the trailing slat assembly.

It should be understood that it is not intended to limit the invention to the particular form and details herein shown and described, and that the invention includes such other forms and modifications as are embraced by the appended claims.

It is claimed and desired to secure by Letters Patent:

1. A picking mechanism for cotton harvesters comprising, in combination, a series of vertical spindle slats each mounting a row of rotary horizontal picking spindles; a conveying mechanism including an endless conveying element operatively mounted for movement in a horizontal oblong path, and a series of vertical pivot elements connected with said conveying element in spaced relation to each other lengthwise of the latter; a series of hinge brackets secured, respectively, to said spindle slats and operatively connected, respectively, with said pivot elements so as to mount said spindle slats for pivotal movement on vertical axes, respectively, and for advance movement transversely to said axes in endless succession along said oblong path, and thrust transmitting means associated, respectively, with said hinge brackets for determining pivotally adjusted positions of said spindle slats as they move along said oblong path, said thrust transmitting means comprising, at each of said hinge brackets, a control wing presenting first and second stop portions spaced radially from the pivot axis of its respective hinge bracket and offset circumferentially thereof from each other, so that upon arcuate movement of successive slats about one end of said oblong path, the picking spindles of the leading one of said slats will be prevented from contacting the picking spindles of the trailing one of said slats by cooperative engagement of said first stop portion on the hinge bracket of said leading slat with said second stop portion on the hinge bracket of said trailing slat.

2. A picking mechanism for cotton harvesters comprising, in combination, a series of vertical spindle slats each mounting a row of rotary horizontal picking spindles; a conveying mechanism including an endless conveying element operatively mounted for movement in a horizontal oblong path, and a series of vertical pivot elements connected with said conveying element in spaced relation to each other lengthwise of the latter; a series of hinge brackets secured, respectively, to said spindle slats and operatively connected, respectively, with said pivot elements so as to mount said spindle slats for pivotal movement on vertical axes, respectively, and for advance movement transversely to said axes in endless succession along said oblong path, and thrust transmitting means associated, respectively, with said hinge brackets for determining pivotally adjusted positions of said slats as they move along said oblong path, said thrust transmitting means comprising, at each of said hinge brackets, a side member extending in generally parallel relation to and in radially spaced relation from the axis of the respective hinge bracket, and a stop flange extending in generally parallel relation to and in transversely spaced relation from said side member with said side member of a leading hinge and slat contactable with said stop flange of a trailing hinge and slat, so that upon arcuate movement of succeeding slats about one end of said oblong path, the radially inner end of said leading one of said slats will be prevented from contacting the radially inner end of said trailing one of said slats by cooperative engagement of said side member of the hinge bracket of said leading slat with said stop flange of the hinge bracket of said trailing slat.

3. A picking mechanism as set forth in claim 2 wherein said slats and their associated hinge brackets are detachably fastened together by separable connecting means between said side members of said hinge brackets and adjacent flange members of the respective spindle slats.

4. A picking mechanism for cotton harvesters comprising, in combination, a series of vertical spindle slats each mounting a row of horizontal rotary picking spindles; a conveying mechanism including an endless conveying element operatively mounted for movement in a horizontal oblong path, and a series of vertical pivot elements connected with said conveying element in spaced relation to each other lengthwise of the latter; a series of hinge brackets secured, respectively, to said spindle slats and operatively connected, respectively, with said pivot elements so as to mount said spindle slats for pivotal movement on vertical axes, respectively, and for advance movement transversely to said axes in endless succession along picking and stripping sides of said oblong path, and thrust transmitting means associated, respectively, with said hinge brackets for determining pivotally adjusted positions of said slats as they move along said oblong path, said thrust transmitting means comprising, at each of said hinge brackets, a control wing extending in a plane at right angles to the pivot axis of the respective hinge bracket and in a radially outward direction relative to said oblong path, a stop margin presented by said control wing at the side of the latter which is the leading side during rearward movement of said hinge brackets along said picking side of said oblong path and a stop edge presented by said hinge bracket at the side of the latter which is the trailing side during said rearward movement so that upon said rearward movement of successive slats along said picking side of said oblong path rearward pivotal movement of the trailing one of said slats will be limited by cooperative engagement of said stop margin of the hinge bracket of said trailing slat with said stop edge of the hinge bracket of said leading slat.

5. A picking mechanism as set forth in claim 4, wherein said control wing presents first and second stop portions spaced radially from the pivot axis of its respective hinge bracket and offset circumferentially thereof from each other with said first and second stop portions of adjacent leading and trailing control wings contactable with each other, so that during arcuate movement of successive slats from said picking side of said oblong path toward said stripping side, the picking spindles of said leading one of said adjacent slats will be prevented from contacting the picking spindles of said trailing one of said slats by cooperative engagement of said first stop portion on the control wing of said leading slat with said second stop portion on the control wing of said trailing slat.

6. A picking mechanism as set forth in claim 4, wherein said thrust transmitting means further comprise, at each of said hinge brackets, a side member extending in generally parallel relation to and in radially spaced relation from the axis of the respective hinge bracket, and a stop flange extending in generally parallel relation to and in transversely spaced relation from the said side member with said side member of a leading hinge and slat contactable with said stop flange of a trailing hinge and slat, so that upon arcuate movement of succeeding slats from said stripping side toward said picking side of said oblong path the radially inner end of said leading one of said slats will be prevented from contacting the radially inner end of said trailing one of said slats by cooperative engagement of said side member of the hinge bracket of said leading slat with said stop flange of the hinge bracket of said trailing slat.

7. A picking mechanism for cotton harvesters comprising, in combination, a series of vertical spindle slats each mounting a row of horizontal rotary picking spindles; a conveying mechanism including an endless conveying element operatively mounted for movement in a horizontal oblong path, and a series of vertical pivot elements connected with said conveying element in spaced relation to each other lengthwise of the latter; a series of hinge brackets secured, respectively, to said spindle slats and operatively connected, respectively, with said pivot elements so as to mount said spindle slats for pivotal movement on vertical axes, respectively, and for advance movement transversely to said axes in endless succession along picking and stripping sides of an oblong path, and thrust transmitting means associated, respectively, with said hinge brackets and comprising, at each slat, a control wing extending in a plane at right angles to the pivot axis of the respective hinge bracket and in a radially outward direction relative to said oblong path, first and second stop portions presented by said control wing at outwardly extending relatively opposed side edges of the latter, a stop edge presented by the hinge bracket at the side thereof facing outwardly from said oblong path, a side member extending in generally parallel relation to and in radially spaced relation from the axis of the respective hinge bracket, and a stop flange extending in generally parallel relation to and in transversely spaced relation from said side member, so that during rearward movement of any pair of relatively adjacent slats along said picking side of said oblong path their pivotally adjusted positions will be determined by cooperative engagement of said control wing of the trailing slat with the said stop edge of the leading slat, and so that during arcuate movement of said leading and trailing slats from said picking side to said stripping side of said oblong path their pivotally adjusted positions will be determined by cooperative engagement of said first stop portion of said leading slat with said second stop portion of said trailing slat, and so that during arcuate movement of said leading and trailing slats from said stripping side to said picking side of said oblong path, their pivotally adjusted positions will be determined by cooperative engagement of said side member of said leading slat with said stop flange of said trailing slat.

8. A hinge bracket for pivoting a cotton picker slat to a carrier chain, said hinge bracket comprising a hub portion having a hinge pin receiving aperture therethrough, a control wing extending radially outward from said hub portion at one side of and in a plane at right angles to the axis of said hinge pin receiving aperture, a mounting wing merging with said hub portion and offset, circumferentially of the latter, and from said control wing, said mounting wing presenting an attaching flange in a plane extending parallel to and spaced radially from said axis of said hinge pin receiving aperture; and a stop flange merging with said mounting wing at a portion thereof radially spaced from said hub portion and extending parallel and in transversely spaced relation to said attaching flange.

9. A hinge bracket as set forth in claim 8 in which said hub portion has an arcuate edge portion intermediate said control and mounting wings at one side of said bracket, and wherein said control wing has an arcuate recess in an edge portion thereof at the other side of said bracket, the curvature of said arcuate recess approximately conforming with the curvature of said arcuate edge portion of said hub portion.

10. A hinge bracket as set forth in claim 8, wherein said stop flange extends parallel to said mounting flange in the direction of a radial line through the axis of said hinge pin receiving aperture.

11. A hinge bracket as set forth in claim 8 and comprising a single piece of plate metal having a flat part forming said hub portion and control wing, an upstanding part forming said attaching flange, and another upstanding part forming said stop flange.

References Cited in the file of this patent

UNITED STATES PATENTS

| | | |
|---|---|---|
| 2,058,513 | Rust et al. | Oct. 27, 1936 |
| 2,533,631 | Rust | Dec. 12, 1950 |